United States Patent Office 3,035,769
Patented May 22, 1962

3,035,769
REMOTE CONTROL ACCOUNTING SYSTEM
Theodorus Reumerman, 12 Zandvoortselaan, Zandvoort, Netherlands, and Willem H. Th. Helmig, 9 Van Slingelandtlaan, Leiden, Netherlands
Filed May 29, 1957, Ser. No. 662,405
Claims priority, application Netherlands May 30, 1956
9 Claims. (Cl. 235—153)

The invention relates to a remote control accounting system, and in particular to a system wherein instructions for bookkeeping operations are transmitted from remote locations to an accounting machine by means of electric impulses.

In recent years, accounting machines have been developed which are able to perform automatically all operations required in bookkeeping. Such a machine comprises data storing means in which the balances of a plurality of accounts are stored, means for reading the old balances of an account to be credited or debited out of said storing means and for adding and subtracting the new entry so as to find the new balance, means for storing the new balance in said storing means, and means for printing a record of all particulars of the transaction. By means of a machine of this kind, a large number of entries may be handled within a relatively short time.

However, an accounting system making use of a machine of this kind still has the draw-back that the instructions for the various operations are received in the form of written documents that must be interpreted by human operators who feed the data into the machine either directly by means of a key board or the like, or indirectly by preparing a machine controlling record, such as a punched card, a tape or the like.

It has been proposed to provide character recognition means that are able to read the written instructions and to translate them into electric impulses for controlling the machine. In general, however, a reliable character recognition system would involve the use of standard typewriters, and of standard instruction forms on which the instructions would have to be typed out with great accuracy.

Thus, a considerable improvement would be obtained if the persons giving the instructions would transmit the same to the accounting machine in the form of electric impulses. However, up till now, written instructions were considered to be indispensable, since they make it possible to check the instructions before they are sent out, and since the written document constitutes a proof that the instructions have been given by a person authorized to do so.

It is an object of the invention to provide a remote control accounting system, wherein instructions for accounting operations may be given by a plurality of participants in the form of electric impulses, but wherein the security with respect to the correctness and the authenticity of the instructions is substantially the same as in a system making use of written instructions.

It is another object of the invention to enable a plurality of persons, such as the clients of a bank, to give instructions for accounting operations by means of the dial of their telephone apparatus or, where a large number of instructions have to be given, by means of a teleprinter or the like.

It is a further object of the invention to provide a checking circuit to be inserted between an incoming telephone line and a recording or accounting device, whereby data transmitted through said telephone line may be checked before recording the same on a machine controlling record, or before entering the same in the accounting device, respectively.

It is still a further object of the invention to provide checking means to be inserted between a telephone line and a recording or accounting device, whereby the person giving instructions for accounting operations by means of his telephone dial is thrown off if the instructions are wrong or unauthorized.

According to a mean feature of the invention, means are provided to divide the series of digits representing a complete instruction and received in the form of impulse trains into a plurality of groups, means for checking at least one of these groups arithmetically, means for checking at least one other group by comparison with data stored in the accounting machine and means for preventing the instruction from being carried out if at least one of these checks gives a negative result.

The exact nature of the invention, and any additional objects thereof will appear from the following description of a preferred embodiment thereof, given with reference to the accompanying drawings.

The drawings represent the circuit diagram of a checking circuit to be inserted between an incoming transmission line and an accounting or recording device.

Figure 1:
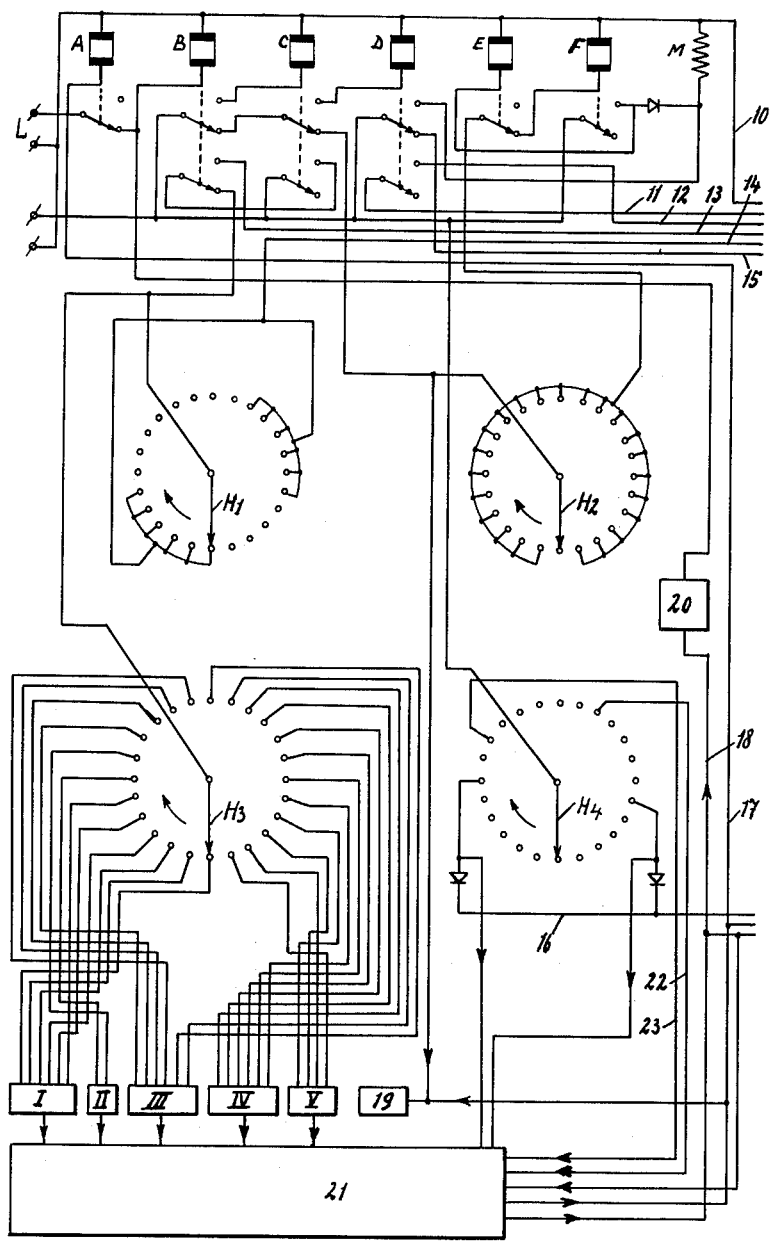
FIG. 1 shows a set of receiving relays, a director switch serving to divided the incoming digits into groups, and an input register from which the received data are supplied to the accounting machine.

For purposes of explanation, the drawings have been based on the assumption that the received impulse trains are of the kind produced by the dial of a telephone apparatus. However, the circuit may be easily adapted to the reception of teleprinter impulses.

Furthermore, it has been assumed in the drawings that the received data are directly supplied to the accounting machine. By some slight alterations, the circuit may be adapted to a system wherein the received data are recorded on a machine controlling record, to be supplied to the accounting machine later on.

Before proceeding to a description of the circuit diagram shown in the drawings, a short description will be given of the accounting system on which the circuit has been based. It will be understood that this accounting system is merely an example of the many kinds of systems for which the present circuit may be used, and that the circuit may be readily adapted to any other system.

It is assumed that a certain number of participants or subscribers, for instance the clients of a bank, are authorized to transfer amounts up to a certain maximum from their own account to the account of any other subscriber by means of the dial of their telephone apparatus. In order to perform such a transaction, a subscriber must transmit the numbers of his own account and of the account to be credited, and the amount to be transferred. In addition, two code numbers must be transmitted, i.e.

a first code number warranting the authenticity of the instruction, and a second code number indicating the reason of the transfer.

It is, of course, of the utmost importance that no errors are made in the transmission of the account numbers. Other errors may be corrected later on, if it is known which accounts are involved, but the account numbers must be absolutely right. For this purpose, the account numbers allotted to the subscribers are made self-checking, so that they may be checked arithmetically as soon as they are transmitted. In the present case, it has been assumed that all account numbers are divisible by thirteen. If any subscriber makes a mistake in dialling an account number, such a mistake will, in general, make the number indivisible by thirteen, so that the mistake may be detected by a checking device based on divisibility by thirteen. The validity of this checking operation is based on the known fact that a large majority of the errors actually made are of two well defined kinds, i.e. one digit errors, whereby a wrong digit appears in one position of the transmitted number, and transposition errors, whereby two digits are interchanged. It may easily be shown that the difference caused by any of these two errors is always indivisible by thirteen, so that these standard errors make a number originally divisible by thirteen indivisible. Random errors are detected by means of the same checking operation with a security of about 90%, so that more than 99% of all errors are detected by said checking operation. Of course, in selecting the account numbers it has to be borne in mind that the digit 0 has the value 10 in telephone transmission, so that the number 120 has the numerical value 100+20+10=130 and is divisible by 13, whereas the number 130 has the numerical value 100+30+10 and is indivisible by 13, for instance.

The first code number, warranting the authenticity of the instruction, is determined as follows. Each subscriber is supplied with a book consisting of a plurality of numbered pages, on which he records the particulars of the instructions given. Thus, the person in possession of this book is the only one to know the serial number of the instruction, as indicated on the next open page of his book. This serial number constitutes the first code number. By comparing this number with the serial number of the previous instruction, which has been stored in the accounting machine, the authenticity of the instruction may be established.

The second code number serves to inform the subscriber whose account has been credited about the reason of payment. This code number may be taken from a code list supplied to all subscribers.

It is assumed that the various numbers are transmitted in the following order.

A subscriber who wants to give an instruction begins, of course by dialling the telephone number of the accounting office. This may be, for instance, a special telephone number of the bank providing the present service. As soon as the connection with the accounting office has been established, he proceeds to dial his instruction as follows:

(1) The number of his own account (6 digits);
(2) The serial number of the instruction (2 digits);
(3) The amount to be transferred (6 digits);
(4) The number of the account to be credited (6 digits);
(5) The second code number (4 digits).

Of course, the number of digits in each number is quite arbitrary, and the above data are only given by way of example. It is of importance, however, that each of the five numbers has a constant number of digits, so that they may be easily separated from each other. This makes it necessary, in general, to exclude amounts larger than a certain maximum, as too many digits would be involved, and to complete small amounts with additional noughts in front.

In the system as described, numbers 1, 2 and 4, i.e. the two account numbers and the serial number of the instruction are checked, whereas numbers 3 and 5, i.e. the amount and the second code number remain unchecked. This has been done to avoid unnecessary complications, but is not essential. It would be quite feasible, for instance, to represent each amount up to 1000.— by a self-checking code number, and to check the same upon reception, but this would involve the use of a coding table by the subscriber, which would make the system more complicated. Also, the second code number might be made self-checking, but this would mean that it would have to contain at least one additional digit. It is a matter of discretion, whether these complications are acceptable or not in a given case.

The circuit shown in the drawings operates in such manner that the instruction is accepted and carried out if numbers 1, 2 and 4 are found to be right, and that the instruction is refused if any one of these numbers is found to be wrong. In the latter case, the subscriber giving the instruction is disconnected. Furthermore, the instruction is refused and the subscriber disconnected if his balance is insufficient to carry out the instruction.

Referring now to FIG. 1 of the drawings, the incoming transmission line is connected to terminals L. The circuit comprises a set of relays indicated at A–F, a director switch having four switch arms H1–H4 and driven by a magnet M, an input register (see, for example, Patent No. 2,696,599) having five sections indicated at I–V, and an accounting machine 21 (see, for example, Patent No. 1,911,863).

Relay A serves to disconnect the calling subscriber if he makes an error, or if his balance is insufficient to carry out his instruction. Relay B is an impulse relay responding to the impulses received through the transmission line. Relay C is a pilot relay which remains excited as long as the circuit is connected with the subscriber's line. Relay D is a digit relay which is de-energized at the end of each impulse train. Relays E and F serve to return the director switch to its zero position.

The operation of the circuit is as follows:
When a subscriber is connected with the circuit, a closed loop is formed across terminals L, so that relay B is energized. Through the upper contact of relay B, relay C is energized; this relay remains in its operating position as long as the connection with the subscriber continues to exist. When the subscriber dials the first digit of his instruction, an impulse train is received at terminals L; each impulse consists of an interruption of the closed loop across terminals L, so that relay B is de-energized; relay C is too slow to be de-energized by an impulse. During the first impulse, relay D is energized through the upper contacts of relays B and C. At the end of the first impulse, relay B is again energized and interrupts the circuit of relay D; however, relay D is too slow to be de-energized during the interval between two impulses, and remains in its operating position until the end of the impulse train representing the first digit. At the first impulse of an impulse train, driving magnet M is energized through the upper contact of relay D. At the end of the first impulse train, relay D is de-energized, which causes magnet M to be de-energized whereby the director switch (switch arms H1–H4) makes one step.

As appears from the drawing, each of the switch arms H1–H4 runs in clockwise direction along a bank of 24 contacts. The switch arms are shown on their zero position. For the purpose of explaining the operation of the switch arms, the contact of each bank on which the switch arm is placed in its zero position (as shown) is assumed to be contact 1, and the contacts are assumed to be numbered from 1 to 24 in clockwise direction.

The checking device shown in FIG. 2, and to be described hereinafter, is connected with the circuit of FIG. 1 through a first set of conductors, indicated at 10–15, and a second set of conductors indicated at 16–18.

Conductor 10 is permanently connected with the negative terminal of the voltage source. Conductors 11 and 12 are interconnected during the transmission of a digit (relay D energized). Conductor 13 is connected with the positive terminal of the voltage source through the lower contacts of relays C and B in the intervals between impulses and between digits (relay B energized). Conductor 14 is connected with the contacts 1–6 and 15–20 of the contact bank of switch arm H1. Conductor 15 is connected with the positive terminal of the voltage source in the interval between digits (relay D de-energized). Conductor 16 is connected with contacts 7 and 20 of the contact bank of switch arm H4. The connections of conductors 17 and 18 will be described hereinafter.

During each impulse, a positive voltage is supplied through the lower contact of relays C and B to switch arms H1 and H3. During the transmission of the account numbers (positions 1–6 and 15–20 of the director switch), this causes the impulses to be supplied to the checking device through conductor 14. Switch arm H3 distributes the received impulses between sections I–V of the input register, in such manner that the first account number is stored in section I, the serial number of the instruction in section II, the amount to be transferred in section III, the second account number in section IV, and the second code number in section V.

Switch arm H4 is permanently connected with the positive terminal of the voltage source. After reception of the last digit of the first account number, switch arm H4 reaches its 7th position and supplies a positive voltage to line 16. This voltage serves to establish whether the number that has been supplied to the checking device is divisible by 13 or not. If the number is not divisible by 13, the voltage reappears on line 17 and energizes relay A, whereby the subscriber is disconnected. At the same time, the resetting device 19 is energized, whereby the input register is returned to its zero position. If the number is divisible by 13, the voltage reappears on line 18 and operates an audio frequency generator 20, whereby the subscriber receives a signal indicating that he may proceed with his instruction.

The voltage supplied to line 16 through switch arm H4 is also supplied to accounting machine 21, which represents the following instruction to the machine:

Find the data stored with respect to the account of which the number appears in section I of the input register.

However, this instruction is only carried out if a positive voltage appears on line 18, i.e. if the account number has been found to be correct.

After reception of the serial number of the instruction (switch arm H4 in its 9th position) a positive voltage is supplied to line 23. This represents an instruction to machine 21, which may be described as follows:

Read out the serial number of the previous instruction, add one and compare the result with the number stored in section II of the input register; supply a positive voltage to line 17 if the number in section II is wrong, and to line 18 if the number is right.

Thus, the subscriber is disconnected if he has dialled a wrong serial number, and receives an audio frequency signal if he has dialled the right one.

After reception of the amount to be transferred (switch arm H4 in its 15th position), a positive voltage is supplied to line 22. This represents the following instruction to the accounting machine:

Read out the old balance; subtract the amount appearing in section III of the input register; supply a positive voltage to line 17 if the result is negative, and to line 18 if the result is positive.

Thus, the subscriber is disconnected if his balance is insufficient to carry out his instruction, and receives an audio frequency signal if his balance is sufficient.

Figure 2:
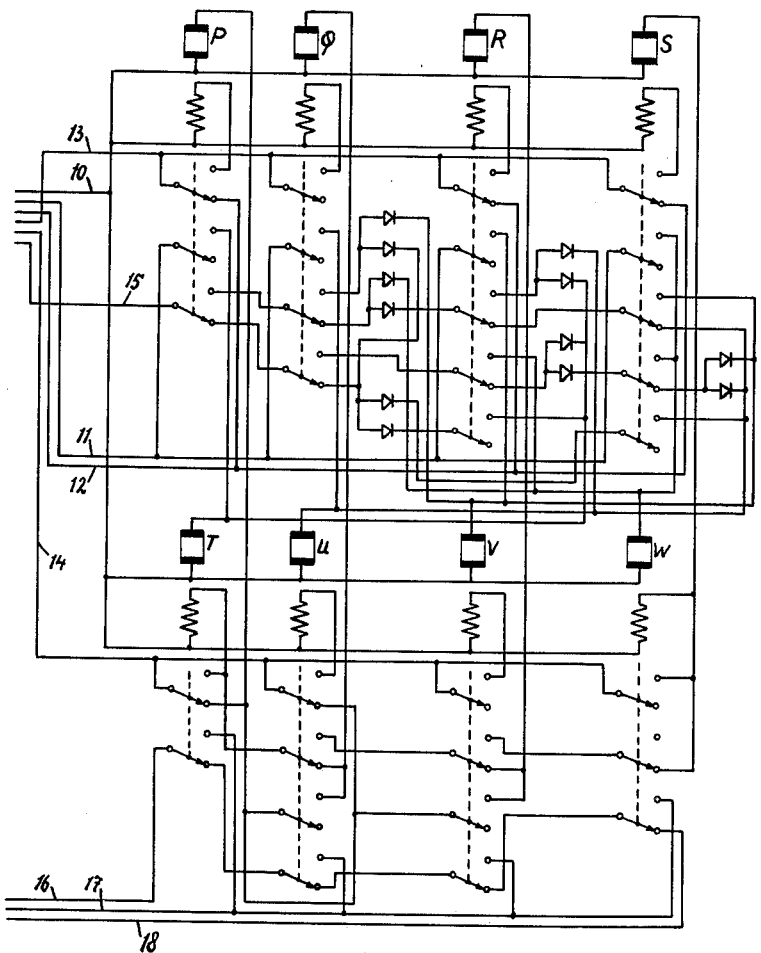
FIG. 2 shows a checking device for arithmetically checking certain digit groups.

After reception of the second account number (switch arm H4 in its 21st position), a positive voltage is supplied to line 16, and the second account number is checked by the device of FIG. 2 in the same manner as described hereinbefore with respect to the first account number. At the same time, the said positive voltage is supplied to the accounting machine, which represents the instruction:

Find the data stored with respect to the account of which the number appears in section IV of the input register; read out the old balance and add the amount appearing in section III, store the new balances of both accounts; store the new serial number of the first account; transmit all particulars to printer, together with the number to appear in section V.

However, this instruction is only carried out if a voltage appears on line 18, i.e. if the second account number has been found to be correct.

As soon as the calling subscriber has finished his instruction, he interrupts the connection, whereby relay C is de-energized.

Through the upper contact of relay C, the resetting device 19 is energized, whereby the input register is returned to its zero position. In general, the director switch will be in its zero position at this moment.

If, however, the subscriber is thrown off, because he has made an error, or if he interrupts the connection before finishing his instruction, the director switch must be reset to its zero position. For this purpose, relay F is energized through the upper contact of relay C and through switch arm H2. Magnet M is energized through the contact of relay F; at the same time, relay E is energized and interrupts the circuit of relay F; relay F is de-energized, and the director switch makes one step. Relay E is now de-energized, and the same procedure is repeated, until switch arm H3 has reached its zero position.

Referring now to FIG. 2, the checking device shown in this figure comprises an adding register, consisting of four relays T, U, V and W, and a result register consisting of four relays P, Q, R and S. The relays of both registers represent the values 1, 2, 4 and 8, respectively. Each relay has an operating winding and a holding winding.

Initially, all relays are de-energized as shown in the drawing.

During the first impulse of the first digit, a positive voltage appears on line 14, so that relay P is energized through the upper contact of relay T. During the interval after this impulse, line 13 is excited, so that relay P is held. Since lines 11 and 12 are interconnected, relay T is energized through the second contact of relay P. The second impulse appearing on line 14 energizes relay Q through the upper contact of relay T and the second contact of relay U; relay T is held through its upper contact; relay P is de-energized. In the interval after the second impulse, relay U is energized and relay T de-energized; relay Q is held. The third impulse energizes relays P and Q, and so on. Thus, it will be seen that the impulses appearing on line 14 are counted in binary fashion. After each impulse, the result appears in the upper or result register; in the interval after the impulse, it is transferred to the lower or adding register in order to prepare the circuit for the next impulse. However, as soon as the number 13 appears in the result register, the voltage on line 11 disappears, as the upper contacts of relays P, R and S are in their working positions. Thus, the number 13 is not transferred to the adding register, but the latter is reset to zero instead thereof. Hence, the result register never counts to more than 13, after which it begins to count from 1 again.

After reception of a digit, when relay D is de-energized, a voltage appears on line 15. At the same time, the connection between lines 11 and 12 is interrupted. Thus, the new position of the adding register is not directly determined by the position of the result register, but the number registered in the result register is multiplied by 10, and the remainder obtained on division of the product by 13 is transferred to the adding register. It may easily be seen from the drawing that the voltage appearing on line 15 is always supplied to such a combination of relays in the adding register that the latter registers a number congruent (modulo 13) with ten times the number appearing in the result register. This operation may be further illustrated by the following table showing which relays of the adding register are energized by the voltage on line 15 for each number registered in the result register.

| result register | | adding register | |
|---|---|---|---|
| number registered | relays energized | relays energized | number registered |
| 1 | P | U, W | 10 |
| 2 | Q | T, U, V | 7 |
| 3 | P, Q | V | 4 |
| 4 | R | T | 1 |
| 5 | P, R | T, U, W | 11 |
| 6 | Q, R | W | 8 |
| 7 | P, Q, R | T, V | 5 |
| 8 | S | U | 2 |
| 9 | P, S | V, W | 12 |
| 10 | Q, S | T, W | 9 |
| 11 | P, Q, S | U, V | 6 |
| 12 | R, S | T, U | 3 |
| 13 | P, R, S | none | 0 |

Thus, the device shown in FIG. 2 is found to operate according to the formula:

$$p' = R_{13}(10\ p + a)$$

wherein $p'$ is the new result after a digit $a$ has been entered, and $p$ is the previous result. The operator $R_{13}$ indicates that the remainder on division by 13 has to be taken.

Thus, if a plurality of digits are successively supplied to the checking device in the form of impulses on line 14, as described hereinbefore, the final position of the result register will be equal to the remainder on division by 13 of the number represented by the said digits. If the number supplied to the checking device is divisible by 13, the final position of the result register will be the zero position, and the adding register will also assume the zero position immediately after reception of the last digit.

If the adding register occupies its zero position, a voltage appearing on line 16 will reappear on line 18; if the adding register does not occupy its zero position, the said voltage will appear on line 17.

If the subscriber is disconnected due to an error, or if he interrupts the connection before finishing his instruction, the registers of the checking device are reset to zero due to the disappearance of the voltage on line 13.

Figure 3:
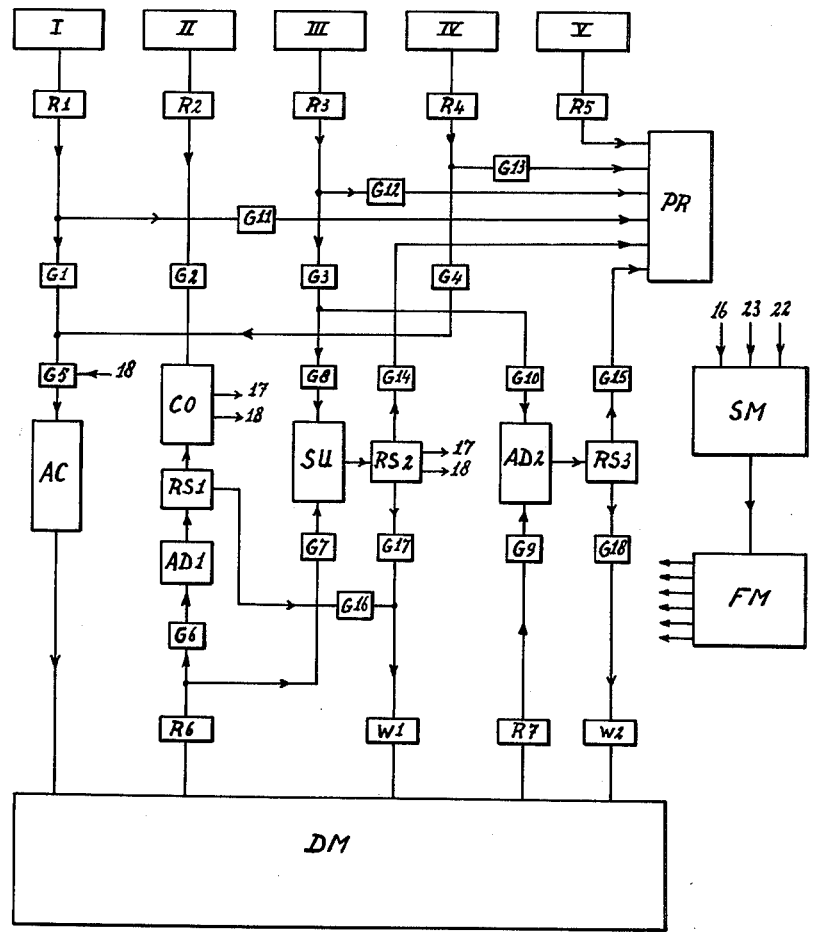
FIG. 3 is a block diagram showing the accounting machine and its cooperation with the input registers I–V.

Apart from the said input registers, the circuit of FIG. 3 comprises read-out devices R1–R5 for each of the said registers, a data memory DM, an access circuit AC serving to find the data pertaining to a given account in the memory DM, a comparator CO for comparing the received serial number with the previously stored serial number, and adding circuit AD1 for adding one to the previously stored serial number, a register RS1 for storing the result of this addition, a subtracting circuit SU for subtracting the amount to be transferred from the balance of the first account, a register RS2 for storing the result of this subtraction, an adding circuit AD2 for adding the amount to be transferred to the balance of the second account, a register RS3 for storing the result of this addition, a sequence memory SM, a function memory FM and a printer PR. Furthermore, the circuit comprises a plurality of gates G1–G18 controlled by the function memory FM in such manner that the various operations are performed in the required order. The function memory FM also controls the read-out devices R1–R5, the read-out devices of data memory DM, of which two are shown at R6 and R7, and the writing devices of data memory DM, of which two are shown at W1 and W2. All of the said parts are well known in the computer art, so that a detailed description is superfluous.

The operation of the circuit is as follows:

After receipt of the first account number, which is stored in register I, line 16 is excited, and the sequence memory SM supplies the signals required for the first step to function memory FM. Read-out device R1 is put into operation, gate G1 is opened, and as soon as gate G5 is opened by the signal appearing in line 18 to signify that the account number has been approved, the account number is supplied to the access circuit, which finds the data pertaining to the account in the data memory.

In the second step, read-out devices R2 and R6 are put into operation, and gates G2 and G6 are opened. The previous serial number is taken from the data memory and supplied to adding circuit AD1, in which one is added. The result is stored in register RS1. The serial number appearing in register II is supplied to comparator CO, together with the number appearing in register RS1, and the two are compared. Line 17 or 18 is excited according to the result of the comparison.

In the third step, read-out devices R3 and R6 are put into operation and gates G3 and G7 are opened. The amount appearing in register III, and the old balance registered in memory DM are supplied to the subtracting circuit SU, in which the said amount is subtracted from the said balance; the result of this operation is stored in register RS2. Line 17 or 18 is excited in dependence on the sign of the result.

In the fourth step, read-out device R4 is put into operation and gate G4 is opened. As soon as G5 is opened by the voltage on line 18, signifying that the account number has been approved, the account number in register IV is supplied to the access circuit AC and the data of the second account are traced in the data memory. After that, gates G3, G9 and G10 are opened, and read-out devices R3 and R7 are put into operation, so that the amount to be transferred and the old balance of the second account are supplied to adding circuit AD2. The result of the addition is stored in register RS3.

Finally, gates G11–G15 are opened and read-out devices R1, R3, R4 and R5 are operated to supply all particulars of the operation to the printing device PR. At the same time, the new serial number in register RS1 and the new balance in register RS2 are supplied to writing device W1 through gates G16 and G17 to be registered in the part of the data memory relating to the first account, and the new balance appearing in register RS3 is supplied through gate G18 to writing device W2 to be registered in the part of the data memory relating to the second account. After that, the whole system is reset to its original condition.

Although the invention has been described hereinbefore by reference to a specific embodiment thereof, it will be understood that many alterations and modifications are possible within the scope of the invention as set forth in the claims.

In particular, it might be useful to enable the calling subscriber to check the amount to be transferred by an acoustical repetition of the digits of this amount after transmission of this amount, either in the form of impulses or "pips" or as spoken digits taken from a tape or the like. As an alternative, an arithmetical check on the amount to be transferred is also feasible, as stated hereinbefore.

If a teleprinter is used for transmitting the instructions, the circuit of FIG. 2 will have to be modified to adapt the same to the teleprinter impulses; this might be done, for instance, by adding a translator transforming the teleprinter impulses into the usual telephone impulse trains.

Although, in the circuit as shown in the drawings, the impulses are directly transmitted to the accounting machine, it is also feasible to use these impulses for operating a recorder, which prepares a machine controlling record, from which the digits are entered into the machine at any suitable time. In this case, the check on the serial number has to be postponed until the moment of processing the instruction in the machine. Thus, the circuit shown in the drawings might be used in combination with a recorder, which would take the place of the accounting machine 21, provided that the connections between this machine and the contact of switch arm H4 were omitted, as well as the connections leading from the machine to lines 17 and 18.

Furthermore, although the circuit has been described with reference to a money transfer system, it will be understood that the same principles may be applied to any desired accounting system, for instance to a stock administration, to the administration of reservation in public conveyances, and so on.

We claim:

1. In a remote control accounting system wherein accounting instructions are transmitted in the form of electric impulse trains, each representing a digit, to a computer including storage means and means for carrying out said instructions, an input circuit for receiving said impulse trains, means coupled with said input circuit for dividing a series of impulse trains representing an accounting instruction into a plurality of groups each representing a number, means for checking at least one of said groups on the base of divisibility of the represented number by a predetermined prime number, means for interrupting said input circuit if said represented number is indivisible by said prime number, means for checking at least one other of said groups by determining the difference between the represented number and the number represented by a corresponding group stored in said storage means during transmission of a previous accounting instruction relating to the same account, and means for interrupting said input circuit if said difference is unequal to one.

2. In a remote control accounting system wherein accounting instructions are transmitted in the form of electric impulse trains, each representing a digit, to a computer including storage means and means for carrying out said instructions, an input circuit for receiving said impulse trains, means coupled with said input circuit for dividing a series of impulse trains representing an accounting instruction into a plurality of groups each representing a number, means for checking at least one of said groups representing an account number on the base of divisibility of said account number by a predetermined prime number, means for interrupting said input circuit if said account number is indivisible by said prime number, means for checking at least one other of said groups representing a serial number by determining the difference between said serial number and a corresponding serial number stored in said storage means during transmission of a previous accounting instruction relating to the same account, and means for interrupting said input circuit if said difference is unequal to one.

3. In a remote control accounting system wherein accounting instructions, each comprising at least one account number and at least one serial number, are transmitted, in the form of electric impulse trains each representing a digit and produced by means of the dial of a telephone apparatus, to a computer including storage means and means for carrying out said instructions, means for dividing a series of impulse trains representing an accounting instruction into a plurality of groups each representing a number, means for checking at least one of said groups representing an account number on the base of divisibility by a predetermined prime number, means for disconnecting said telephone apparatus if said account number is indivisible by said prime number, means for checking at least one other of said groups representing a serial number by determining the difference between said serial number and a corresponding serial number stored in said storage means during transmission of a previous accounting instruction relating to the same account, and means for disconnecting said telephone apparatus if said difference is unequal to one.

4. In a remote control accounting system wherein accounting instructions, each comprising at least one account number, are transmitted in the form of electric impulse trains each representing a digit and produced by means of the dial of a telephone apparatus to a computer including storage means and means for carrying out said instructions, means for dividing a series of impulse trains representing an accounting instruction into a plurality of groups each representing a number, means for checking at least one of said groups representing an account number on the base of divisibility by a predetermined prime number, and means for disconnecting said telephone apparatus if said account number is indivisible by said prime number.

5. A checking circuit suitable for insertion between a transmission line through which accounting instructions are transmitted in the form of electric impulse trains, each representing a digit, and a computer including storage means and means for carrying out said instructions, comprising an input circuit for receiving said impulse trains, means coupled with said input circuit for dividing a series of impulse trains representing an accounting instruction into a plurality of groups each representing a number, means for checking at least one of said groups on the base of divisibility of the represented number by a predetermined prime number, and means for disconnecting said transmission line.

6. A checking circuit as claimed in claim 5 wherein said dividing means is a director switch directing the impulse trains of at least one of said groups to said checking means.

7. A checking circuit suitable for insertion between a transmission line through which accounting instructions are transmitted in the form of electric impulse trains, each representing a digit, and a computer including storage means and means for carrying out said instructions, comprising means for dividing a series of impulse trains received through said transmission line and representing an accounting instruction into a plurality of groups each representing a number, a checking device for determining the remainder on division by a predetermined prime number of any number supplied thereto in the form of a plurality of impulse trains, means for supplying at least one of said groups representing an account number to said checking device, means for supplying at least one other of said groups representing a serial number to said computer for comparison with a corresponding serial number stored in said storage means during transmission of a previous accounting instruction relating to the same account, and means for disconnecting said transmission line so as to prevent the instruction from being carried out if said account number is indivisible by said prime number or if said serial number differs by more than one from said previous serial number.

8. A checking device for numbers appearing in the form of electric impulse trains, each representing a digit, based on divisibility by a predetermined prime number, comprising an adding register consisting of a plurality of relays each representing a different power of two, a result register consisting of a plurality of relays each representing a different power of two means for supplying each impulse of an impulse train through contacts of said adding register to the relays of said result register in such manner that each impulse sets the result register to a value one higher than the setting of said adding register, means operative in the interval between two impulses for transferring the setting of said result register to said adding register except in the case that said predetermined prime number appears in said result register, and means operative between two impulse trains and including at least one circuit extending through contacts of said result register to the relays of said adding register for setting said adding register to a value corresponding with the remainder obtained on division of said predetermined prime number of 10 times the result appearing in said result register.

9. A checking device as claimed in claim 8, further comprising a checkout circuit extending through contacts of at least one of the said registers for establishing whether a number supplied to the device is divisible by said prime number or not.

References Cited in the file of this patent

UNITED STATES PATENTS

| | | |
|---|---|---|
| 1,911,863 | Webner | May 30, 1933 |
| 2,352,492 | Ostline | June 27, 1944 |
| 2,597,428 | Bachelet | May 20, 1952 |
| 2,653,996 | Wright | Sept. 29, 1953 |
| 2,689,950 | Bayliss et al. | Sept. 21, 1954 |
| 2,696,599 | Holbrook et al. | Dec. 7, 1954 |
| 2,700,755 | Burkhart | Jan. 25, 1955 |
| 2,670,463 | Raymond et al. | Mar. 27, 1956 |
| 2,740,106 | Phelps | Mar. 27, 1956 |
| 2,759,669 | Knutsen | Aug. 21, 1956 |
| 2,765,982 | Knutsen | Oct. 9, 1956 |